US005845207A

United States Patent [19]

[11] Patent Number: 5,845,207

[45] Date of Patent: Dec. 1, 1998

Amin et al.

[54] SERVICE TRANSFER TO A WIRELESS TELEPHONE

[75] Inventors: Umesh J. Amin; Michael Buhrmann, both of Redmond, Wash.

[73] Assignee: AT&T Wirless Services, Inc., Middletown, N.J.

[21] Appl. No.: 644,027

[22] Filed: May 9, 1996

[51] Int. Cl.[6] .......... H04Q 7/38

[52] U.S. Cl. .......... 455/414; 455/417; 455/445

[58] Field of Search .......... 455/414–16, 417, 455/461, 467, 551, 445, 575, 403, 433; 379/210–211

[56] References Cited

U.S. PATENT DOCUMENTS

| | | | |
|---|---|---|---|
| 5,029,233 | 7/1991 | Metroka | 455/11 |
| 5,168,517 | 12/1992 | Waldman | 379/67 |
| 5,206,901 | 4/1993 | Harlow et al. | 379/211 |
| 5,222,123 | 6/1993 | Brown et al. | 455/417 |
| 5,414,759 | 5/1995 | Ishikuri et al. | 379/211 |
| 5,440,620 | 8/1995 | Slusky | 379/211 |
| 5,481,590 | 1/1996 | Grimes | 379/211 |
| 5,590,174 | 12/1996 | Tsuji et al. | 379/211 |
| 5,600,704 | 2/1997 | Ahlberg et al. | 379/211 |

FOREIGN PATENT DOCUMENTS

| | | | |
|---|---|---|---|
| 0 378 450 A2 | 7/1990 | European Pat. Off. | H04Q 7/04 |
| 0378 450 A3 | 7/1990 | European Pat. Off. | H04Q 7/04 |
| 0 378 450 B1 | 11/1991 | European Pat. Off. | H04M 1/72 |

*Primary Examiner*—Wellington Chin
*Assistant Examiner*—Philip J. Sobutka

[57] ABSTRACT

In a wireless communication network, a feature initiation signal is received from a first wireless telephone, a data record for a second telephone is updated, and calls placed to the second telephone are routed to the first wireless telephone based on the updated data record. The first wireless telephone may be a mobile telephone in a vehicle, and a registration signal generated by the mobile telephone upon provision of power thereto may serve as the feature initiation signal. The second telephone may also be a wireless telephone, such as a portable telephone. When an outgoing call code is received from the first wireless telephone, the network places the outgoing call in accordance with the outgoing call code and augmenting information from the data record for the second telephone.

19 Claims, 5 Drawing Sheets

SERVICE TRANSFER TO A WIRELESS TELEPHONE

BACKGROUND OF THE INVENTION

The present invention relates to wireless communications, and in particular, to the transfer of services between a first wireless telephone and a second wireless telephone.

Two types of telephone apparatus are well known to wireless communications subscribers. A first type of wireless telephone apparatus is a mobile telephone, generally characterized as being installed in a vehicle, having a base unit which is somewhat cumbersome to carry, and having peripheral devices attached thereto, such as a handset, speaker, hands-free microphone and possibly visual display area. A second type of wireless telephone apparatus is a portable telephone, generally characterized as handheld, having all parts contained in a small enclosure, and having relatively limited battery life due to the need to minimize weight.

Usually, a subscriber having both a portable telephone and a mobile telephone prefers to use the mobile telephone when in or close to the vehicle having the mobile telephone, as the mobile telephone does not have a battery life constraint and usually is more convenient to operate while in the vehicle. However, the portable telephone may have particular services associated therewith which the subscriber wishes to receive and/or the subscriber may wish to receive calls to the portable telephone at the mobile telephone.

One way for the subscriber to attempt to attain service transfer is for the subscriber to use a call forwarding service offered by telecommunications network providers. In a typical call forwarding service, the subscriber uses a first telephone, such as a portable telephone, to input a second (forwarding) number to the telecommunications network. Thereafter, the network automatically directs all calls placed to the first telephone number to the second telephone number. In a variation, the subscriber uses a second telephone to call into the call forwarding system, provides identification information such as a password, and initiates call forwarding. To terminate call forwarding, the subscriber uses the first or second telephone to enter a termination code to the network.

A drawback of using the above-described call forwarding is that action is required by the subscriber for each use of call forwarding, that is, call forwarding is not automatically activated.

Another drawback of using call forwarding is that only incoming calls are affected, that is, the first telephone number may have outgoing services associated therewith, such as entering a short code in place of a full telephone number (speed dialing), which are not accessible through the second telephone as a result of the call forwarding.

Another way for the subscriber to attempt to attain service transfer is for the subscriber to obtain and use a coupling device in conjunction with both telephones. For example, it has been proposed in U.S. Pat. No. 5,029,233, to equip the mobile telephone with an interface which allows the mobile telephone to transfer identifying information from the portable telephone, and then the mobile telephone assumes the identity of the portable telephone for subsequent communication.

A drawback of using such a coupling device is that it must be purchased and installed.

Another drawback of a coupling device is that action is required by the subscriber for each use of the device, such as placing the portable phone in contact with the device and activating the device.

A further drawback of a coupling device is that it does not necessarily work with all types of mobile and portable telephones.

Yet another drawback of a coupling device is that it works with only a limited number of telephones at one time, such as one portable telephone and one mobile telephone.

As explained above, there is no truly convenient way for a subscriber having both a portable telephone and a mobile telephone to use the mobile telephone when in or close to the vehicle having the mobile telephone.

SUMMARY OF THE INVENTION

In accordance with the present invention, in a wireless communication network, a feature initiation signal is received from a first wireless telephone, a data record for a second telephone is updated, and calls placed to the second telephone are routed to the first wireless telephone based on the updated data record.

The first wireless telephone may be a mobile telephone in a vehicle, and a registration signal generated by the mobile telephone upon provision of power thereto may serve as the feature initiation signal. The second telephone may also be a wireless telephone, such as a portable telephone.

The second telephone may be selected from a plurality of telephones identified in a profile associated with the first wireless telephone, based on a dialog with a user of the first wireless telephone to identify the second telephone, a key actuated by a user of the first wireless telephone, or a sensor status signal received from the first wireless telephone.

When an outgoing call code is received from the first wireless telephone, the network places the outgoing call in accordance with the outgoing call code and augmenting information from the data record for the second telephone.

Also in accordance with the present invention, a first wireless telephone installed in a vehicle comprises a base station for generating a feature initiation signal including sensor status information identifying a subscriber of a second wireless telephone, and a transceiver for sending the feature initiation signal to a wireless communication network so that the wireless communication network transfers calls placed to the second wireless telephone to the first wireless telephone.

Further in accordance with the present invention, a wireless communication network receives a feature initiation signal from a first wireless telephone, accesses a first profile associated with the first wireless telephone to identify a second telephone, accesses a second profile associated with the second telephone describing services configured for the second telephone, and provides the services described in the second profile through the first wireless telephone.

Still further in accordance with the present invention, a communication network receives a feature initiation signal from a first telephone, updates a profile for a second telephone to indicate routing calls placed to the second telephone to the first telephone, receives an outgoing call code from the first telephone, and places the outgoing call in accordance with the outgoing call code and augmenting information from the profile associated with the second telephone.

It is not intended that the invention be summarized here in its entirety. Rather, further features, aspects and advantages of the invention are set forth in or are apparent from the following description and drawings.

DETAILED DESCRIPTION

Figure 1:
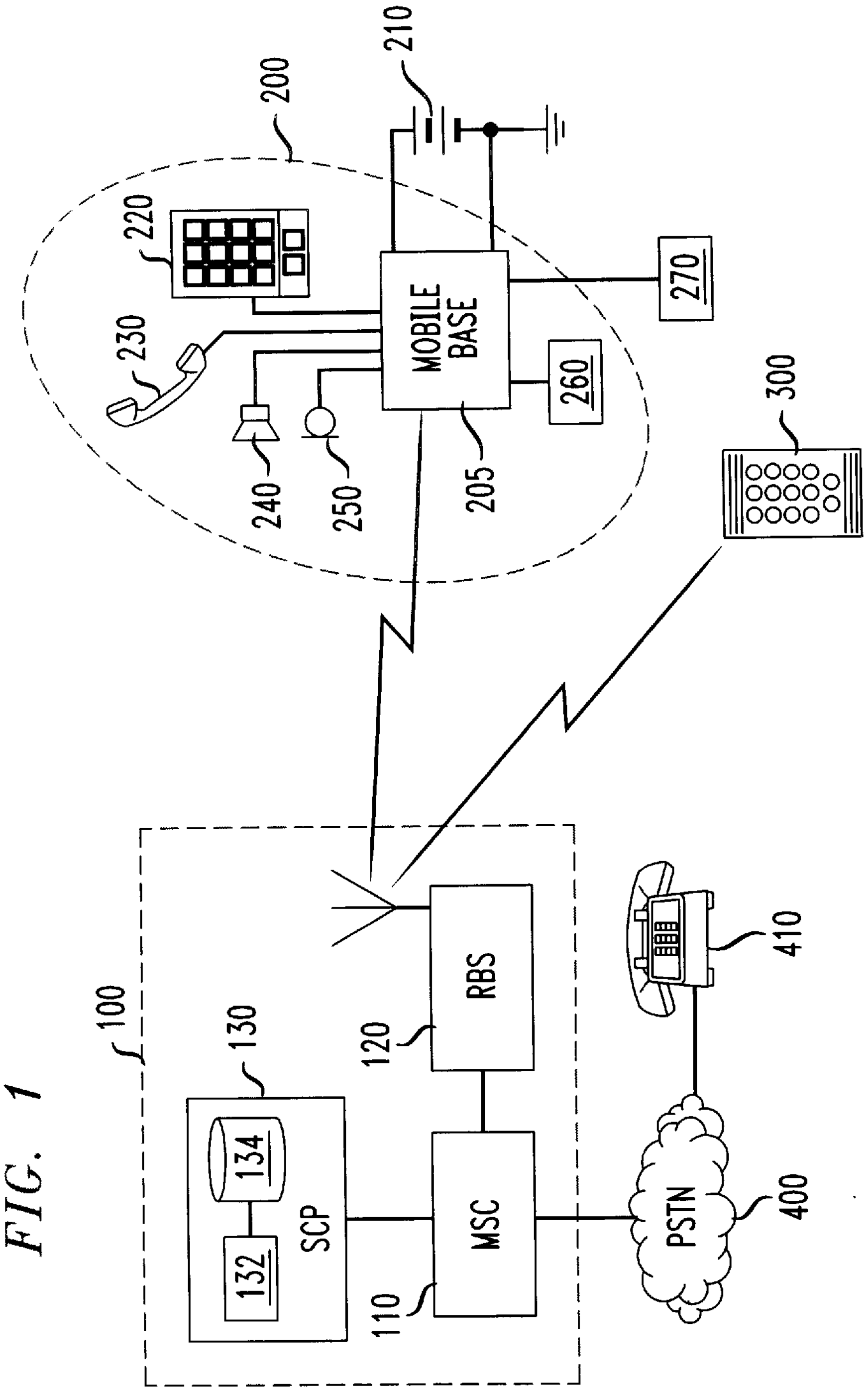
FIG. 1 is a block diagram of an environment having two wireless telephones.

FIG. 1 shows an environment in which the present inventive technique may be applied. A wireless cellular communication network 100 includes a mobile switching center (MSC) 110, a radio base station (RBS) 120, and a service control point (SCP) 130. The SCP is sometimes referred to as a home location register (HLR). As is well known, the wireless network 100 includes a plurality of MSCs, each of which has multiple radio base stations coupled thereto. Each RBS serves a geographic area, or cell. In FIG. 1, only one of each MSC 110 and RBS 120 are shown, for clarity. RBS 120 is coupled to MSC 110 which comprises a telecommunications switch and functions to control RBS 120. The MSC 110 is also coupled to the public switched telephone network (PSTN) 400, so that wireless telephones may communicate with land-line stations such as telephone 410. The MSC 110 is further coupled to SCP 130, which includes processor 132 and database 134 containing data records such as subscriber profiles for mobile telephones and portable telephones. Processor 132 may be a computer processing stored program instructions in a manner which is well known in the art. Alternatively, processor 132 may be circuitry for carrying out the SCP logic functions described below. For further information on wireless cellular communication networks, see Neil L. Boucher, *Cellular Radio Handbook*, 3rd edition, Quantum Publishing, Mill Valley, Calif., 1995, which is incorporated herein by reference.

FIG. 1 also shows a mobile station 200, alternatively referred to as a mobile telephone 200, having a base station 205 mounted in a vehicle (not shown). The mobile base station 205 is coupled to a battery 210 powered by the vehicle. The telephone 200 may include a keypad 220, handset 230, speaker 240 and microphone 250 adapted for "hands-free" operation. The telephone 200 further includes a display 260, such as a multiple-line liquid crystal display (LCD) used for telecommunications message and mobile telephone status information. Keypad 220, handset 230 and display 260 may be in one hand-held unit. The mobile telephone 200 may also be coupled to a sensor 270, as discussed below.

The base station 205 is adapted to communicate with RBS 120 via a wireless link using a conventional transceiver (not shown). The telephone 200 is controlled by a control system (not shown) located in the base station 205 which may include a microprocessor or microcomputer and a memory for storing programs executed by the control system to control the functions of the telephone 200. The memory may also be used to store other information entered by the subscriber, the communication service provider or the manufacturer, such as subscriber preferences, subscriber telephone number, and pre-stored subscriber messages.

FIG. 1 further shows a portable wireless telephone 300 adapted to communicate with RBS 120 via a wireless link. It will be understood that multiple mobile telephones and multiple portable telephones communicate with RBS 120, and these are not shown for clarity.

Figure 2A:
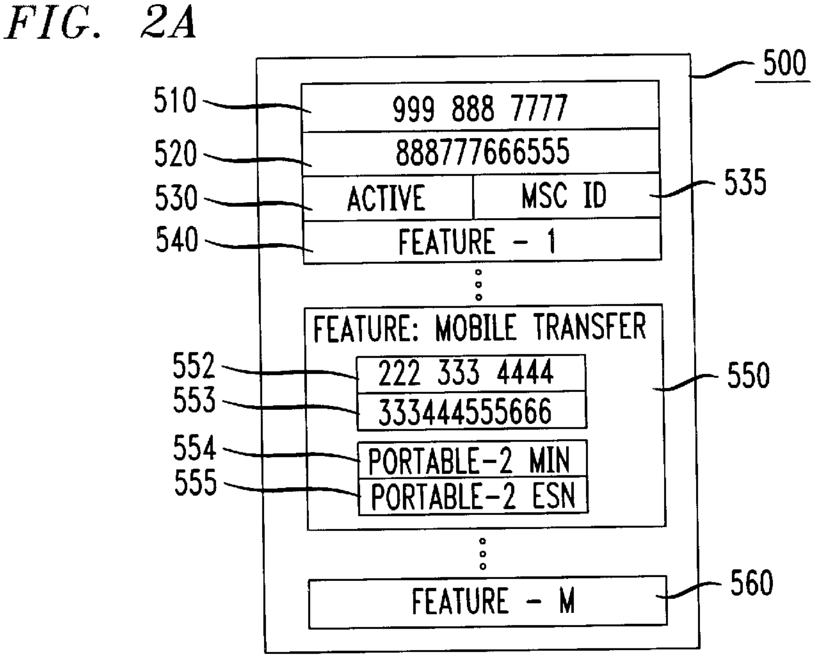
FIGS. 2A–2B are charts indicating the structure of a mobile telephone profile record and a portable telephone profile record.
Figure 2B:
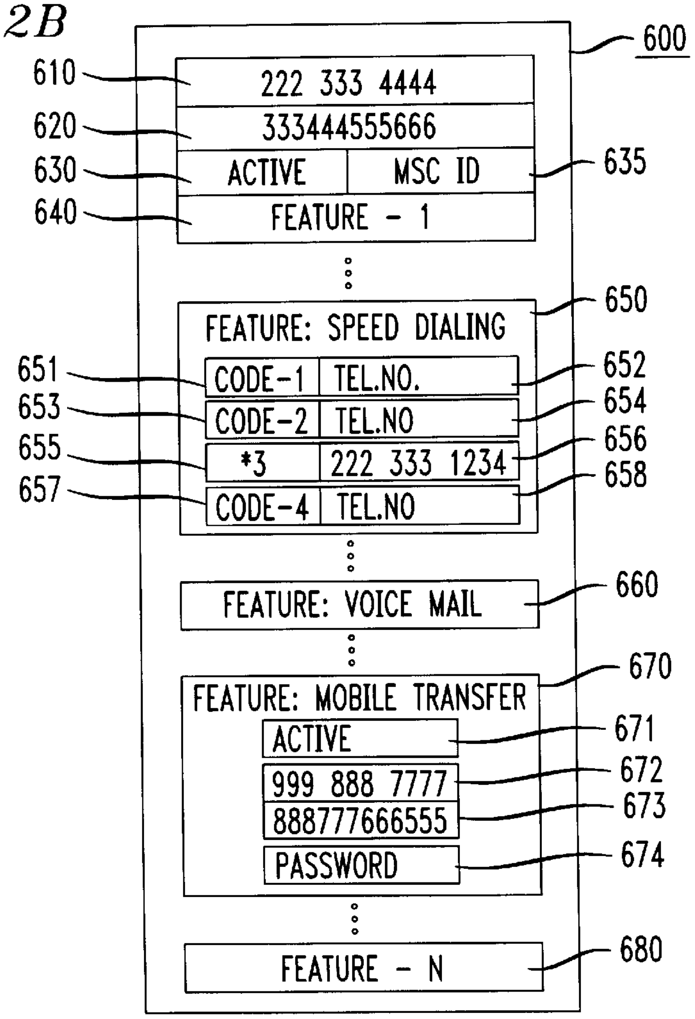

A subscriber profile may include an association of a subscriber name, billing address, mobile station identification number (MIN), i.e., the telephone number for the subscriber mobile or portable telephone, a unique mobile station electronic serial number (ESN), and entries for services available to the subscriber and associated wireless telephone. The term "mobile" is used in the terms MIN and ESN in accordance with convention to include "mobile" and "portable" as these terms are used in the instant specification and claims. The structure and elements of a subscriber profile record may vary depending on the particular implementation. FIGS. 2A and 2B show examples of portions of a mobile telephone profile record and a portable telephone profile record, respectively. In this embodiment, the profiles are stored in database 134 shown in FIG. 1. In other embodiments, storage occurs in other network elements in addition to or in place of database 134.

An embodiment according to the present inventive technique will now be described.

It will be appreciated that telephone numbers are used herein for example purposes only. There is no significance to the use of any particular telephone number other than to exemplify the present invention. No reference to actual telephone numbers is intended.

As illustrated in FIG. 2A, the mobile telephone profile data record 500 includes the MIN 510 and ESN 520 of the mobile telephone 200, which together uniquely identify the mobile telephone. An ACTIVE field 530 indicates whether the mobile telephone is in operation. If the mobile telephone 200 is operative, an MSC ID field 535 indicates with which MSC, such as MSC 110, the mobile telephone 200 is registered, and the MSC 110 keeps track of which of its coupled RBSs is serving the mobile telephone 200. As the mobile telephone 200 changes position, the network 100 automatically updates the above-described location information for mobile telephone 200. Also included in the mobile telephone profile data record 500 is information concerning features 540, 550, 560 to which the mobile telephone subscriber has subscribed. Mobile transfer feature information 550 includes unique identifications of portable telephones, such as MIN 552 and ESN 553 for portable telephone 300 and MIN 554 and ESN 555 for a second portable telephone. In this example, let it be assumed that only MIN 552 and ESN 553 for the portable telephone 300 have been previously stored.

As illustrated in FIG. 2B, the portable telephone profile data record 600 includes similar elements as the mobile telephone profile data record 500, and the description thereof will be omitted for brevity.

Speed dialing feature information 650 includes previously stored codes 651, 653, 655, 657 respectively associated with previously stored telephone numbers 652, 654, 656, 658. In the speed dialing service, when the user of telephone 300 having MIN 610 enters one of the codes 651, 653, 655, 657, the telephone network places a call to the associated telephone number 652, 654, 656, 658. For example, if the user enters "*3", the network places a call to "222 333–1234".

Mobile transfer feature information 670 in the portable telephone profile data record 600 for portable telephone 300 includes an ACTIVE field 671, indicating whether the mobile transfer service is presently activated, predefined MIN 672 and ESN 673 for mobile telephone 200, and password 674. In other embodiments, MIN 672 and ESN 673 are not pre-defined, but rather are defined when the mobile transfer service is activated, and in these embodiments, password 674 may be specified to verify the authority of the activator.

It will be appreciated that a portable telephone subscriber who subscribes to the mobile transfer service has mobile transfer feature information 670 in the portable telephone profile data record 600 associated with that subscriber, whereas a portable telephone subscriber who has not subscribed to the mobile transfer service lacks mobile transfer feature information 670 in their associated portable telephone profile data record 600.

Figure 3A:
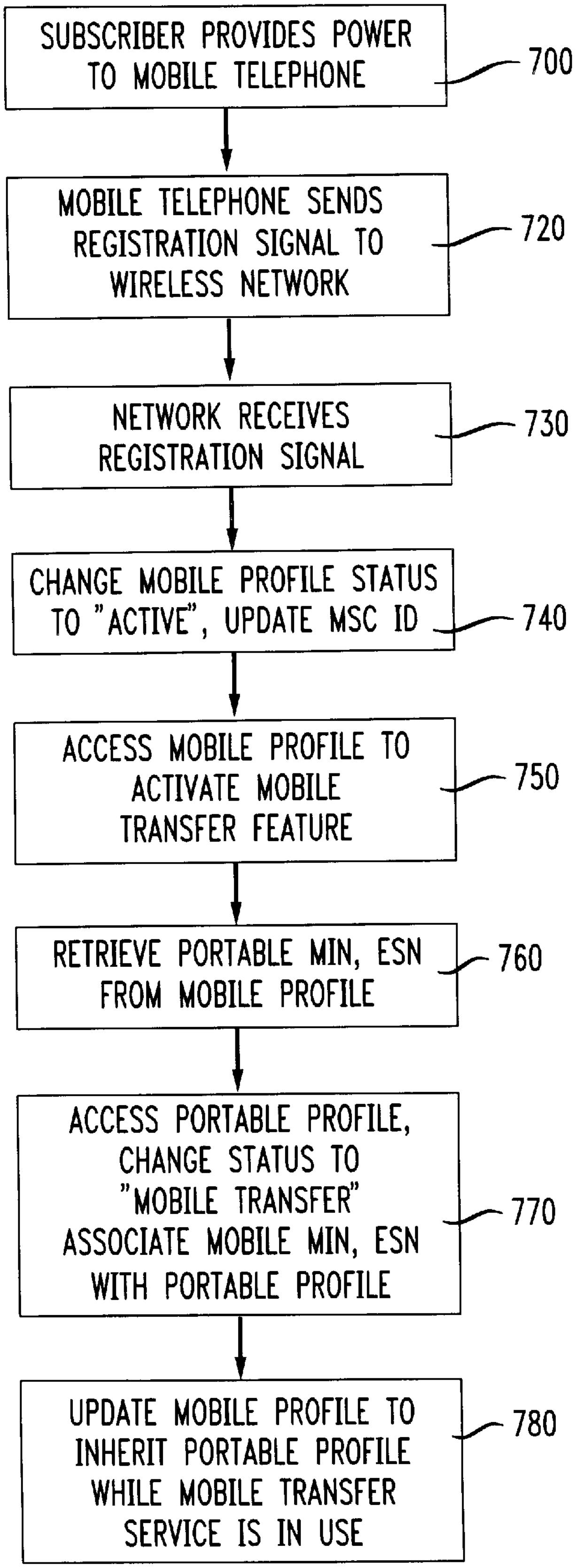
FIGS. 3A–3C are flowcharts illustrating the inventive technique.
Figure 3B:
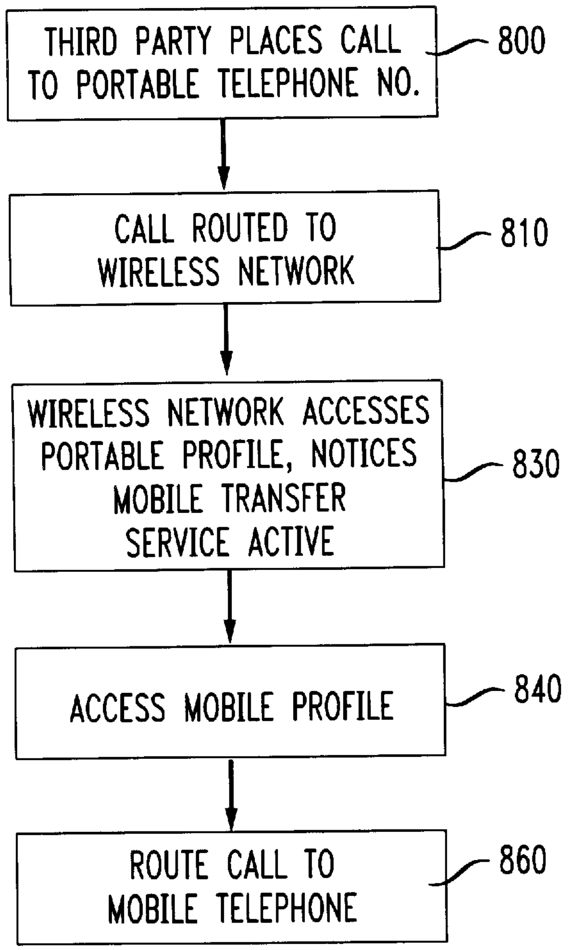
Figure 3C:
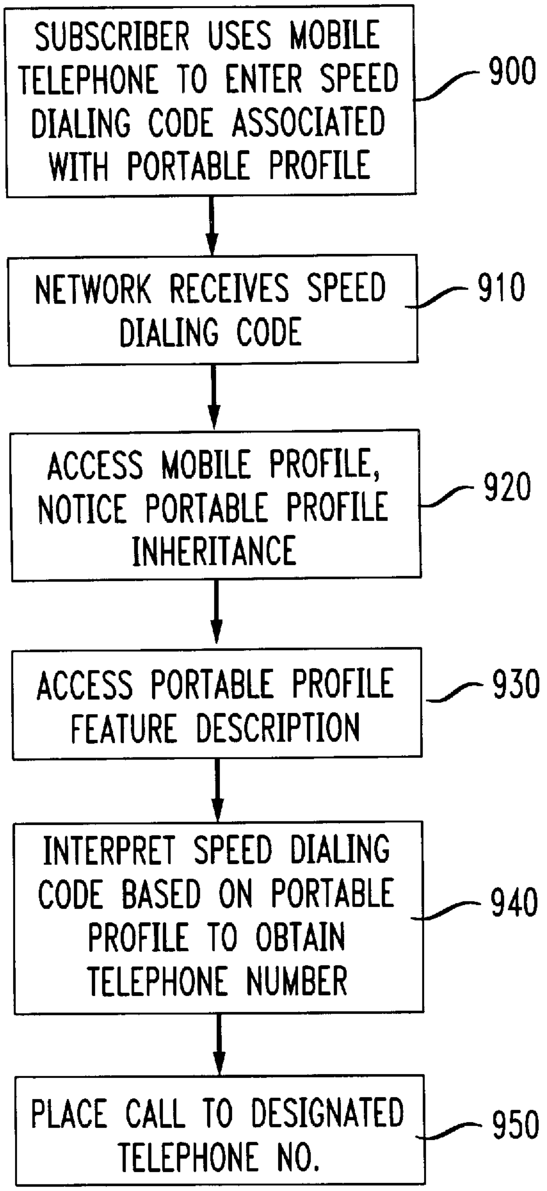

FIGS. 3A–3C are flowcharts illustrating operation of the inventive technique.

FIG. 3A illustrates initiation of the mobile transfer service. At step 700, the subscriber provides power to the mobile telephone 200, such as by turning the vehicle ignition key. At step 720, base station 205 generates a conventional registration signal which is sent by the telephone 200 to the wireless network 100. At step 730, RBS 120 receives the registration signal and forwards it to MSC 110. The term "registration signal" means a signal sent by mobile telephone 200 when power is first supplied thereto, for the purpose of registering the mobile telephone 200 with the wireless network 100. MSC 110 passes the registration signal and its own identification to SCP 130.

At step 740, the mobile telephone profile data record 500 is accessed, its field 530 updated to ACTIVE, and its MSC ID field 535 updated to indicate that the mobile telephone 200 is registered with MSC 110. At step 750, the mobile telephone profile data record 500 is scanned to determine which features, also referred to as services, are active for the mobile telephone 200.

In this example, let it be assumed that the mobile transfer feature is initiated whenever the mobile telephone 200 is operational. At step 760, MIN 552 and ESN 553 of portable telephone 300 are obtained from mobile transfer feature information 550, and at step 770 are used to access the portable telephone profile data record 600 and update its status field 671 to MOBILE TRANSFER ACTIVE.

Step 780 is described below.

The procedure for mobile transfer service termination is similar but reciprocal to the mobile transfer service initiation procedure illustrated in FIG. 3A. When a conventional deregistration of the mobile telephone 200 occurs, the wireless network 100 updates the mobile telephone profile data record 500 and portable telephone profile data record 600 to indicate that the mobile telephone 200 is not in use, and that the portable telephone 300 no longer has a status 671 of MOBILE TRANSFER ACTIVE.

FIG. 3B illustrates incoming call processing when the mobile transfer service is active.

At step 800, a third party places a call to the portable telephone 300 using, for example, land-line telephone 410. PSTN 400 receives the call and at step 810, the call is routed to MSC 110 of wireless network 100 in a conventional manner. At step 830, MSC 110 accesses SCP 130 for the portable telephone profile data record 600. The SCP 130 notices status field 671 indicating that the mobile transfer service is active, and obtains MIN 672 and ESN 673 from mobile transfer feature information 670. At step 840, SCP 130 accesses the mobile telephone profile data record 500 associated with MIN 672 and ESN 673 to obtain routing information and sends the routing information to MSC 110. At step 860, MSC 110 routes the call to the mobile telephone 200.

Thus, when a subscriber having portable telephone 300 begins using his or her mobile telephone 200, calls to the portable telephone 300 are automatically forwarded to the mobile telephone 200 without particularly directive action from the subscriber, thereby allowing the subscriber to use the convenience of the mobile telephone 200.

It will be appreciated that features in addition to call transfer may be encompassed in the mobile transfer service, in a similar manner. Candidate features for mobile transfer include short message service, wherein a message sent to the portable telephone 300 is transferred to the mobile telephone 200 for display on display 260; message waiting indication, i.e., a type of short message service in which the message is originated by PSTN 400 or network 100 to indicate that a message for the subscriber is waiting in the network; calling number identification; and selective call acceptance. When portable telephone 300 is configured for both mobile transfer service and selective call acceptance service, only calls which would otherwise go to the portable telephone 300 after screening by the selective call acceptance service are forwarded to mobile telephone 200 by the mobile transfer service.

In accordance with another aspect of the present inventive technique, let it be assumed that the mobile telephone profile data record 500 has information for multiple portable telephones associated with the mobile transfer feature information 550, such as the portable telephones for the subscriber and subscriber's spouse, and that a preferential ordering for the portable telephones is predetermined.

It is possible for none, some or all of the associated portable telephones to have their calls forwarded to the mobile telephone 200. The preferential ordering is a list, in most likely order, of which portable telephones will have their calls forwarded.

The operation of this embodiment is similar to the single portable telephone embodiment described above. However, during mobile transfer service initiation, the network 100 performs selection processing for the portable telephones associated with the mobile telephone 200, such as through a dialog with the user of the mobile telephone 200 by synthesizing or replaying pre-recorded messages, to which the user responds with speech or pressing at least one key on keypad 220.

As a further alternative, when mobile telephone 200 is coupled to sensor 270, the mobile telephone 200 sends the status of sensor 270 along with the registration signal. The mobile telephone 200 thereafter transmits any change in status of information sensed by sensor 270. The sensor 270 functions to sense at least one identifying characteristic which differs by portable telephone user. For example, sensor 270 may sense how the vehicle driver's seat, steering wheel and/or rearview mirror are adjusted. Instead, sensor 270 may read a memory in the vehicle containing preference information identifying the subscriber, such as a stored seat adjustment preference.

Alternatively, sensor 270 may be part of an interface unit to which portable telephone 300 is coupled, and sensor 270 may electronically read identifying information from the portable telephone 300.

The sensed characteristic is used to alter the predetermined preferential ordering of which portable telephone should have its calls transferred to the mobile telephone. If the user has arranged for transfer of the calls placed to only one portable telephone at a time, then the sensed characteristic determines which portable telephone, such as either the portable telephone identified by MIN 552 and ESN 553 or the portable telephone identified by MIN 554 and ESN 555, will have its calls transferred to mobile telephone 200.

In the embodiments described above, the mobile telephone registration signal functions as a mobile transfer service feature initiation signal. More specifically, in the above-described embodiments, it was assumed that the mobile transfer service was operative whenever the mobile telephone was operative. In other embodiments, the mobile transfer service feature initiation signal may be explicitly entered by the subscriber so that the mobile telephone can be in use without having calls placed to a portable telephone transferred thereto. In such embodiments, the subscribers explicitly enters a feature initiation signal for the mobile transfer service, such as a non-numeric key ("*" or "#") followed by a numeric key (0–9). As used herein and in the claims, "feature initiation signal" refers to a signal which causes processing of the mobile and portable telephone profile data records 500 and 600 to configure them for operation according to the mobile transfer service, as exemplified in FIG. 3A.

Similarly, in the embodiments described above, de-registration of the mobile telephone 200 functions as a mobile transfer service termination signal. In other embodiments, the mobile transfer service termination signal may be explicitly entered by the subscriber, in a similar manner as discussed above for the call forwarding service feature initiation signal. As used herein and in the claims, "feature termination signal" refers to a signal which causes processing of the mobile and portable telephone profile data records 500 and 600, which have been configured for operation according to the mobile transfer service, to be configured such that the mobile transfer service is inactive.

In a further embodiment according to the present inventive technique, the mobile telephone profile data record 500 may indicate that calls for portable telephones not previously identified in the mobile telephone profile data record 500 may be forwarded to the mobile telephone 200. This feature is particularly convenient for portable telephone subscribers using a rental vehicle equipped with mobile telephone 200.

The operation of this embodiment requires that the customer uniquely and securely identify his or her portable telephone via the mobile telephone 200. In this case, in response to a feature initiation signal, the network engages in a dialog with the customer to obtain identification of the portable telephone using one or more of synthesized speech, pre-recorded messages, utterances by the customer and keys pressed by the customer.

In this embodiment, sensor 270 may be a programmable device adapted to receive portable telephone identifying information from the user of the mobile telephone 200. For example, the identifying information may comprise the telephone number (MIN) and a password for the portable telephone 300, the name and social security number of the portable telephone subscriber, or the MIN and ESN of the portable telephone 300.

In the embodiments described above, only forwarding of in-coming calls for the portable telephone 300 to the mobile telephone 200 was described. In another aspect, the outgoing services available to the portable telephone 300 may be accessed through the mobile telephone 200.

FIG. 3C illustrates outgoing call processing for the speed dialing service when the mobile transfer service is active.

Let it be assumed that at step 780 of FIG. 3A, during mobile transfer service initiation processing, the mobile telephone profile data record 500 was modified or linked to enable inheriting of the features configured in the portable telephone profile data record 600 while the mobile transfer service is in operation. The modification occurs by, for example, temporarily copying the feature information 640, 650, 660 in the portable telephone profile data record 600 into the mobile telephone profile data record 500, placing a pointer to the portable telephone profile data record 600 in the mobile telephone profile data record 500, or creating a temporary composite mobile telephone profile data record 500 including the portable telephone profile data record 600 feature information 640, 650, 660.

When an outgoing call is placed, at step 900 illustrated in FIG. 3C, the subscriber using the mobile telephone 200 enters speed dialing code 655 which has previously been defined in the portable telephone profile data record 600.

At step 910, the network 100 receives speed dialing code 655, and at step 920, accesses the mobile telephone profile data record 500. At step 930, the speed dialing feature information 650 is accessed in a manner appropriate for how the speed dialing feature information 650 was linked to the mobile telephone profile data record 500. At step 940, the network 100 uses the entered speed dialing code 655 to obtain telephone number 656. At step 950, the network places a call to the telephone number 656.

It will be appreciated that features other than speed dialing can be inherited in similar manner. Candidate features for inheritance by mobile telephone 200 include: voice dialing, three-way calling, calling number identification, private numbering plan, and voice mail access wherein the MINs of the portable telephone 300 and mobile telephone 200 are associated with the same mailbox.

When calls from multiple portable telephones are transferred to the mobile telephone 200, feature inheritance is operative for only the first portable telephone in the preferential ordering. Alternatively, feature inheritance is operative for only a predetermined one of the portable telephones.

In the embodiments described above, the first telephone was a mobile telephone and the second and subsequent telephones were portable telephones. However, in other embodiments, the telephones may be each be a mobile telephone, a portable telephone or a conventional land-line telephone.

In the embodiments described above, billing for portable telephone services used through the mobile telephone is to the account of the portable telephone. Alternatively, some or all of the services may be billed to the account of the mobile telephone. As another alternative, a combined bill for the portable and mobile telephones may be provided.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A method for operation of a wireless communication network for transferring calls from a second wireless telephone to a first wireless telephone, comprising the steps of:

receiving a feature initiation signal from the first wireless telephone, accessing a profile of the first wireless telephone to retrieve an identification of the second wireless telephone, updating a profile for the second wireless telephone to indicate that calls placed to the second wireless telephone are to be routed to the first wireless telephone, and routing calls placed to the second wireless telephone to the first wireless telephone based on the updated profile for the second wireless telephone.

2. The method of claim 1, further comprising the steps of receiving an outgoing call code from the first wireless telephone, and placing the outgoing call in accordance with the outgoing call code and augmenting information from the profile for the second wireless telephone.

3. The method of claim 1, further comprising the steps of receiving a feature termination signal from the first wireless telephone, modifying the profile for the second wireless telephone, and terminating routing of calls placed to the second wireless telephone to the first wireless telephone based on the modified profile.

4. The method of claim 1, wherein the first wireless telephone is a mobile telephone in a vehicle.

5. The method of claim 4, wherein the feature initiation signal is a registration signal generated by the mobile telephone.

6. The method of claim 4, wherein the feature initiation signal is automatically generated upon provision of power to the mobile telephone.

7. The method of claim 1 wherein said step of accessing a profile of the first wireless telephone to retrieve an identification of the second wireless telephone further comprises the step of:

selecting the identification of the second wireless telephone from a plurality of wireless telephones identified in the profile for the first wireless telephone.

8. The method of claim 7, wherein the step of selecting includes a dialog with a user of the first wireless telephone to identify the second wireless telephone.

9. The method of claim 7, wherein the step of selecting is responsive to a key actuated by a user of the first wireless telephone.

10. The method of claim 7, wherein the step of selecting is responsive to a sensor status signal received from the first wireless telephone.

11. A wireless communication network for transferring calls from a second wireless telephone to a first wireless telephone, comprising:

a radio base station for receiving a feature initiation signal from a first wireless telephone, a database for storing profiles of the first and second wireless telephones, a processor for:

accessing the profile of the first wireless telephone to retrieve an identification of the second wireless telephone, and updating the profile of the second wireless telephone to indicate that calls placed to the second wireless telephone are to be routed to the first wireless telephone, and a switch for routing calls placed to the second wireless telephone to the first wireless telephone based on the updated profile of the second wireless telephone.

12. The network of claim 11, wherein an outgoing call code is received from the first wireless telephone, and the switch is operative to place an outgoing call in accordance with the outgoing call code and augmenting information from the profile of the second wireless telephone.

13. The network of claim 11, wherein the radio base station is also operative to receive a feature termination signal from the first wireless telephone, the processor is also operative to modify the profile for the second wireless telephone, and the switch is also operative to terminate routing of calls placed to the second wireless telephone to the first wireless telephone based on the modified profile.

14. The wireless communication network of claim 11 wherein the profile of the first wireless telephone comprises a plurality of identifications of a second wireless telephone.

15. The network of claim 11, wherein the first wireless telephone is a mobile telephone in a vehicle.

16. The network of claim 15, wherein the feature initiation signal is a registration signal generated by the mobile telephone.

17. The network of claim 15, wherein the feature initiation signal is automatically generated upon provision of power to the mobile telephone.

18. A method for operation of a wireless communication network, comprising the steps of:

receiving a feature initiation signal from a first wireless telephone, accessing a first profile associated with the first wireless telephone to identify a second telephone, accessing a second profile associated with the second telephone describing outgoing call services configured for the second telephone, and providing the outgoing call services described in the second profile through the first wireless telephone.

19. The method of claim 18, further comprising the steps of updating the profile for the second telephone, and routing calls placed to the second telephone to the first wireless telephone.

* * * * *